United States Patent [19]
Takasan et al.

[11] Patent Number: 5,983,076
[45] Date of Patent: Nov. 9, 1999

[54] ANTENNA UNIT FOR COMMUNICATION SYSTEM FOR MOVABLE BODY

[75] Inventors: Masaki Takasan; Yasuharu Odachi, both of Kariya, Japan

[73] Assignee: Kabushiki Kaisha Toyoda Jidoshokki Seisakusho, Aichi-ken, Japan

[21] Appl. No.: 08/920,147

[22] Filed: Aug. 26, 1997

[30] Foreign Application Priority Data

Aug. 29, 1996 [JP] Japan .................................. 8-228593

[51] Int. Cl.⁶ .................................................. H04B 5/02
[52] U.S. Cl. ............................ 455/41; 455/562; 455/3.3
[58] Field of Search ............................ 455/3.1, 3.3, 39, 455/41, 517, 562, 523, 557; 343/906, 907

[56] References Cited

U.S. PATENT DOCUMENTS

| | | | |
|---|---|---|---|
| 4,507,646 | 3/1985 | Hamlin et al. ............................. | 455/41 |
| 5,712,614 | 1/1998 | Patel et al. ................................ | 455/3.3 |
| 5,892,795 | 4/1999 | Paret ........................................ | 455/3.3 |

Primary Examiner—Nguyen Vo
Attorney, Agent, or Firm—Morgan & Finnegan, L.L.P.

[57] ABSTRACT

An antenna unit for a communication system is disclosed. The communication system includes a rail, a separable power transmission line provided along the rail, carriages running along the rail while receiving power from the power transmission line, and a fixed station for establishing communications with the carriages. Communications between the carriages and the fixed station are accomplished by transmitting a signal via the power transmission line. The antenna unit is detachably located in the path of the power transmission line. The antenna unit includes an antenna device serving as a communication antenna of the fixed station and a conductive line to which the antenna device is attached. A terminal connects each end of the conductive line to an associated separate part of the power transmission line so that the conductive line is located between the separate parts of the power transmission line, thus forming a combined power/signal transmission line. Another terminal connects the antenna device to a signal line connected to the fixed station. The antenna unit permits easy installation of an antenna without having to perform difficult winding and other steps in the field.

10 Claims, 6 Drawing Sheets

ANTENNA UNIT FOR COMMUNICATION SYSTEM FOR MOVABLE BODY

BACKGROUND OF THE INVENTION

1. Field of the Invention

The present invention relates generally to a communication system for movable bodies or slave units. Communication signals from a master unit are sent over power lines laid along a rail on which the movable bodies run. More particularly, the present invention relates to a detachable antenna unit in which master communication antennas are located.

2. Description of the Related Art

There is a monorail type conveying apparatus in which carriages run along a rail, which is laid on the ceiling of a factory or a warehouse, to convey loads between stations in the factory or warehouse. Japanese Unexamined Patent Publication No. 6-153305 discloses one example of a power supply system for such a conveying apparatus. According to the power supply system, each carriage has a pickup coil, which faces power lines laid along the rail in a contactless state. The pickup coil acquires induced electromotive force as power from the alternating current that flows through the power lines.

The power supply system disclosed in Japanese Unexamined Patent Publication No. 6-153305 will more specifically be described referring to FIGS. 8 and 9. As shown in FIG. 8, two power lines 83 are supported on a rail 81 by support members 82. An alternating current (a high-frequency alternating current of, for example, 200 V) flows through each power line 83. Each carriage acquires power from a pickup device 84 provided in a contactless state facing the two power lines 83. The pickup device 84 includes a core 85 having an approximately E-shaped cross section, and a coil 86 wound around the center projection, 85a, of the core 85.

The carriage communicates with a fixed station provided on the ground, and its operation is controlled based on an instruction signal from the fixed station. When the fixed station, which is known as a parent station or master unit, and the carriage, which is known as a child station or slave unit, communicate with each other via radio signals, crosstalk may occur. Normally, therefore, trolley lines laid along a rail are used to ensure communications between the fixed station and the carriage. When trolley lines are used, however, a collector brush provided on the carriage to contact the trolley lines wears out easily. Further, the laying the trolley lines in addition to the power lines increases the line laying work.

To overcome this shortcoming, a communication method using the power lines has been proposed. In the proposed communication method, a signal for communications is superimposed on the AC that flows through the power lines. The communications between the fixed station and the carriage are accomplished via a pickup coil antenna, which is provided on the carriage.

To improve the communication reliability, it is necessary to suppress as much as possible the attenuation of a signal sent onto the associated power line from the communication antenna. Since antennas cannot be directly wound on the power lines along which the carriage moves, antennas are provided close to the power lines. Since antennas can be fixed to the power lines at the fixed station, by contrast, a communication antenna 87 on the fixed station should preferably be directly wound on each power line 83 as shown in FIG. 9.

Direct winding of the communication antenna 87 around the power line 83 as shown in FIG. 9, however, requires winding a coil midway along the lengthy power line 83. Because, generally speaking, the power line 83 is very long and heavy, handling the power line is not easy. Therefore, the work of winding the communication antenna 87 is very troublesome and inefficient. Further, it is very difficult *to prepare the antenna 87 in the field as designed, and the resulting antenna 87 does not have high quality, which may reduce the reliability of communications.

SUMMARY OF THE INVENTION

It is an objective of the present invention to provide an antenna unit for communications, that simplifies the work of installation on power lines.

It is another objective to provide a communication system for movable bodies that uses such an antenna unit.

Broadly speaking, the present invention relates to an antenna unit for a communication system for movable bodies. The communication system comprises a rail, a power transmission line, part of which is located along the rail, at least one movable body running along the rail while receiving power from the power transmission line, and a fixed station for establishing communications with the movable body. Communications between the movable body and the fixed station are accomplished by transmitting signals via the power transmission line. The antenna unit according to the present invention is constructed to be installed at a point in the power transmission line. This antenna unit includes an antenna device serving as a communication antenna of the fixed station and a conductive member to which the antenna device is attached. The conductive member has two ends. The antenna unit further includes a first terminal and a second terminal. The first terminal is provided to connect each end of the conductive member to an associated separate parts of the power transmission line so that the conductive member is located between the separate parts of the power transmission line, thereby forming a combined power/signal transmission line. The second terminal is provided to connect the antenna device to a signal line connected to the fixed station.

Each end of the conductive member is connected to the power transmission line by the first terminal, so that the conductive member together with the antenna device is located at a point in the power transmission line. The antenna device is connected by the second terminal to the signal line connected to the fixed station. The attachment of the antenna unit to the communication system is completed by the first and second terminals. According to the present invention, the antenna device, serving as the communication antenna of the fixed station, can easily be attached to the communication system along the power transmission line without any difficult handing of the power transmission line.

The antenna device is preferably provided as a coil wound around the conductive member. It is preferable that the antenna device includes a transmission antenna and a reception antenna.

It is preferable that the conductive member should include a conductive metal bar and that the antenna device should be wrapped around the conductive metal bar via an insulator located between the conductive metal bar and the antenna device. In this case, a termination process for the power transmission line as a signal line is facilitated as will be specifically discussed later in the description of the second embodiment. The termination process means an electrical treatment to be done for suppressing the reflection of a signal at the end of the signal transmission path for electrical communications.

It is preferable that the antenna unit further comprises an electronic part that is to be electrically connected to the power transmission line. The electronic part is electrically connected to the conductive member. Therefore, simple connection of the antenna unit to the power transmission line permit the electronic part to be electrically connected to the power transmission line. This can simplify the work involve in connecting the electronic part to the power transmission line.

It is also preferable that the antenna unit be attached to the power transmission line at a location that is outside a running area of the movable body but at a position close to the running area. Accordingly, the distance between the movable body and the antenna device is relatively short, thus suppressing the attenuation of signals transmitted through the power transmission line.

The present invention can be implemented in numerous ways including as an apparatus and a method.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

The first embodiment of the present invention will now be described referring to FIGS. 1 through 5.

Figure 4:
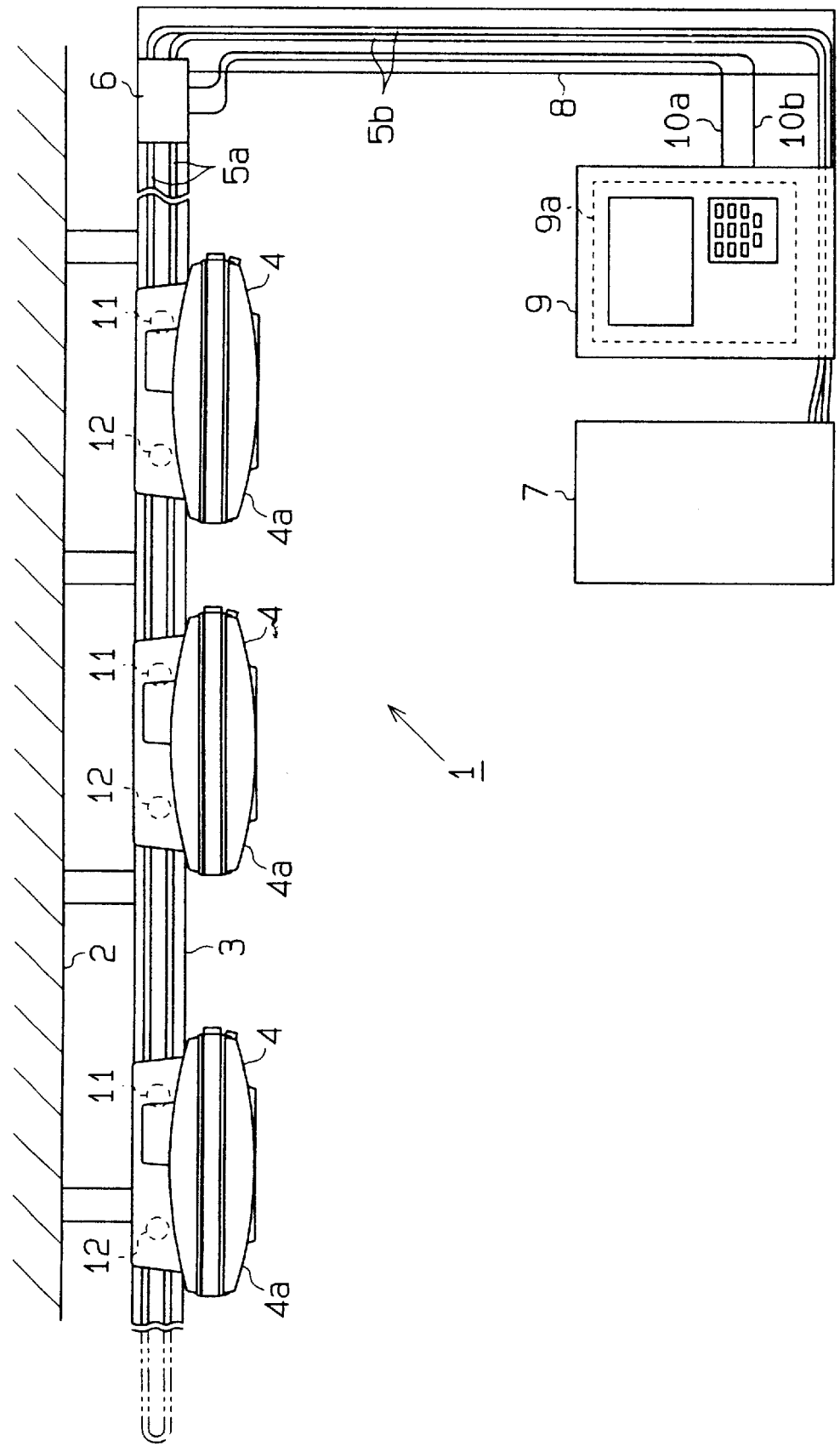
FIG. 4 is a side view showing one part of a conveying system.

FIG. 4 is a conveying system 1, which also serves as a communication system. As shown in FIG. 4, a rail 3 is laid under a ceiling 2. A plurality of carriages 4, or movable bodies, are suspended to run along the rail 3. A power transmission line 5a for supplying power to the individual carriages 4 is laid along the rail 3. Both terminal ends of the power transmission line 5a are connected to power transmission lines 5b via a communication antenna unit 6 provided at the end of the rail 3. The power transmission lines 5b extend from the ground to the end of the rail 3 along a support column 8, and are connected to a power supply unit 7 provided on the ground.

Also provided on the ground is an operation control unit 9, or fixed station (parent station), which instructs the carriages 4 to perform conveying operations. The operation control unit 9 has a controller 9a that communicates with the carriages 4. The controller 9a has signal lines 10a and 10b for sending and receiving signals for the purpose of communications. The signal lines 10a and 10b are laid along the support column 8 and are connected to the communication antenna unit 6. This communication antenna unit 6 will be specifically discussed later.

Figure 3:
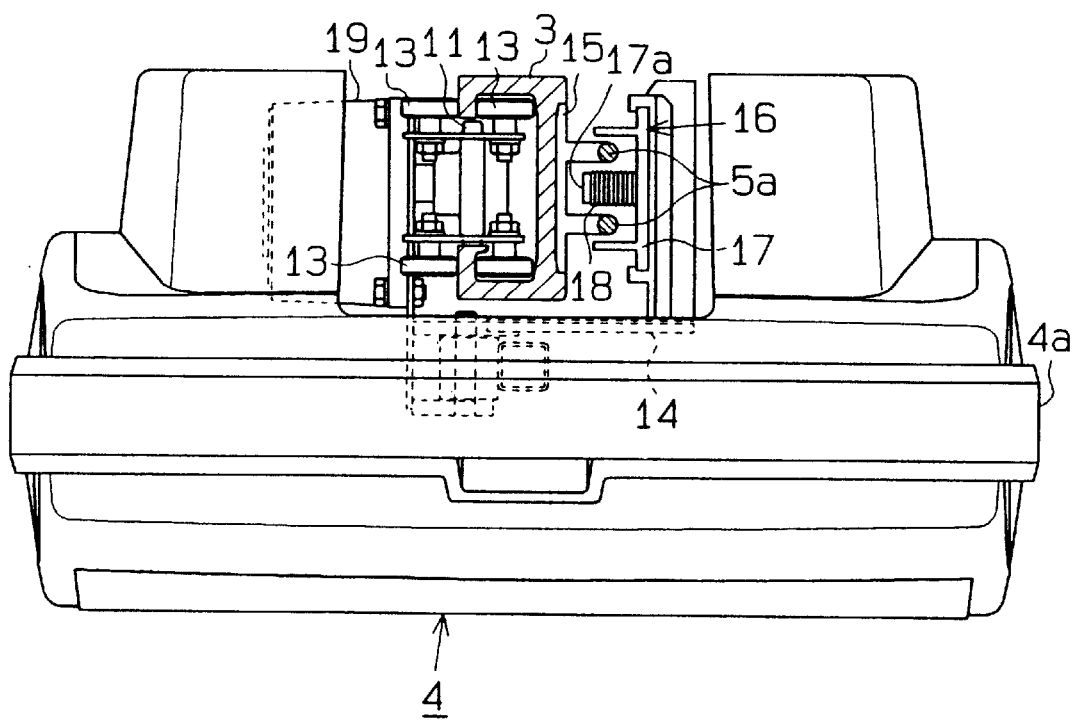
FIG. 3 is a front view of a carriage.

As shown in FIG. 4, each carriage 4 has a drive wheel 11 and a driven wheel 12 at the front and back, respectively. As shown in FIG. 3, in addition to the drive wheel 11 and driven wheel 12, each carriage 4 has plural pairs of guide wheels 13 which grab the rail 3 so as to restrict rocking of the carriage 4. A pair of steering sections 14 are attached to the upper portion of a main body 4a of each carriage 4 and at the front and back of the main body 4a. Each steering section 14 is rotatable within a horizontal plane with respect to the main body 4a. The wheels 11 to 13 are supported on the pair of steering sections 14, so that the wheels 11–13 are steered along the rail 3 in accordance with the movements of the steering sections 14.

The power transmission line 5a is supported by a plurality of support members 15 secured to the back (right-hand side in FIG. 3) of the rail 3 at predetermined intervals. As shown in FIGS. 3 and 4, two parts of the power transmission line 5a, which is looped at the end of the rail 3, extend in parallel along the rail 3 with a predetermined distance between the two parts.

As shown in FIG. 3, a pickup device 16 for power supply is supported on each steering section 14 to face the power transmission line 5a in a contactless manner. Each pickup device 16 has a ferrite core 17 having an approximately E-shaped cross section. A power supply coil 18 is wound around a center projection 17a of the ferrite core 17 nearly at the center between the two parts of the power transmission line 5a. A motor 19 is provided on the steering section 14 on which the drive wheel 11 is supported. The motor 19 drives the drive wheel 11. The pair of power supply pickup devices 16, which are located at the upper portion of each carriage 4 at the front and back thereof, are electrically connected in series to each other.

The reason for the provision of the communication antenna unit 6 at the end of the rail 3 is to relatively shorten the signal transmission path for communications, thereby reducing the signal transmission loss.

Figure 1:
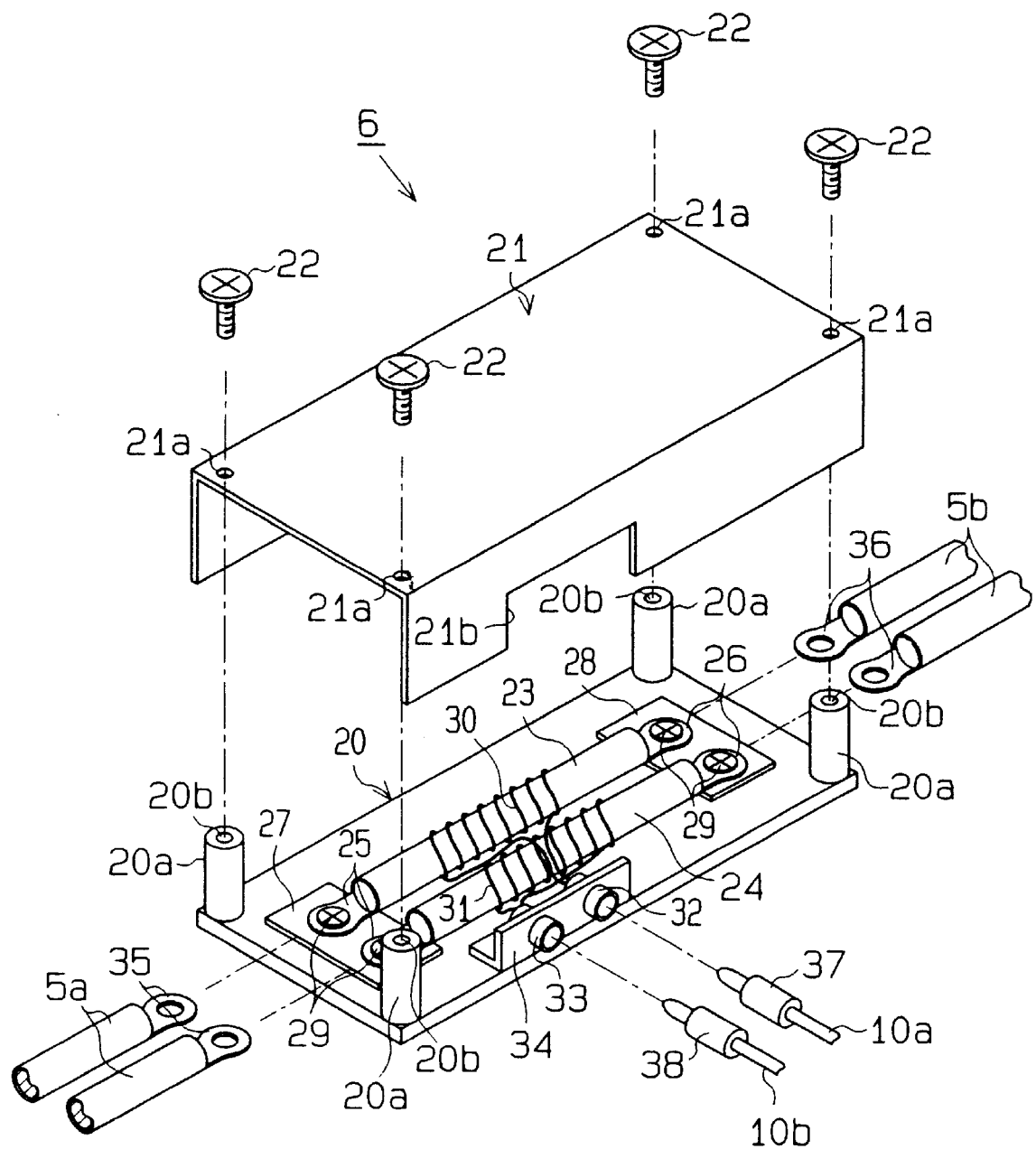
FIG. 1 is an exploded perspective view of a communication antenna unit according to the first embodiment of the present invention.
Figure 2:
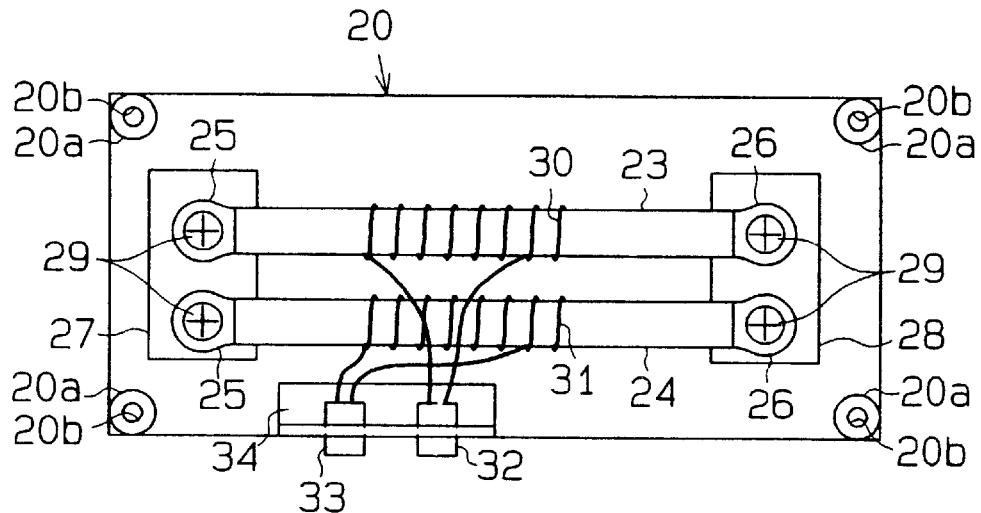
FIG. 2 is a plan view of the antenna unit with its cover removed.

The structure of the communication antenna unit 6 will now be described referring to FIGS. 1 and 2. As shown in FIG. 1, the antenna unit 6 has a support bed 20 and a cover 21, both of aluminum. The support bed 20 is an approximately rectangular plate with four upright support columns 20a provided at its four corners. Screw holes 20b are formed in the distal ends of the support columns 20a. The cover 21 has through holes 21a formed in its top surface at four corners corresponding to the support columns 20a. As screws 22 put through the holes 21a are fastened into the respective screw holes 20b of the support columns 20a, the cover 21 is secured to the support bed 20.

Supported on the top of the support bed 20 are two parallel power supply lines 23 and 24, or conductive members (hereinafter referred to as "conductive lines"). Those conductive lines 23 and 24 are designed with the same power ratings as the aforementioned power transmission lines 5a and 5b. Each of the conductive lines 23 and 24 is an electric wire, the surface of which is covered with an insulator tube. Crimp-style terminals 25 and 26 are secured to both ends of each conductive line 23 or 24. A pair of terminal seats 27 and 28 are fixed on the top of the support bed 20 at two positions set apart by a predetermined distance. Each terminal seat 27 or 28 is comprised of an insulator plate. The two conductive lines 23 and 24 are supported between the pair of terminal seats 27 and 28 by fastening screws 29, which are put through the crimp-style terminals 25 and 26 at both ends of the conductive lines 23 and 24 into the terminal seats 27 and 28. The crimp-style terminals 25 and 26, the terminal seats 27 and 28 and the screws 29 constitute a first connection terminal assembly.

A transmission antenna 30 is wound around the conductive line 23 in a coil shape, while a reception antenna 31 is wound around the conductive line 24 in a coil shape. The transmission antenna coil 30 and reception antenna coil 31 serve as antenna devices.

An L-shaped bracket 34 is fixed to one side of the support bed 20. Attached to the bracket 34 are a BNC terminal 32 for transmission and a BNC terminal 33 for reception. Both ends of the transmission antenna coil 30 are connected to the transmission BNC terminal 32, and both ends of the reception antenna coil 31 are connected to the reception BNC terminal 33. The two BNC terminals 32 and 33 and the bracket 34 constitute a second connection terminal assembly.

Crimp-style terminals 35 are secured to the distal ends of the power transmission line 5a. Crimp-style terminals 36 are secured to the distal ends of the power transmission lines 5b, which are connected to the power supply unit 7. These power transmission lines 5a and 5b are connected in series via the communication antenna unit 6 by connecting the individual crimp-style terminals 25 on the first end of the two conductive lines 23 and 24 to the crimp-style terminals 35 on the power transmission line 5a using the screws 29 and by connecting the individual crimp-style terminals 26 on the second end of the two conductive lines 23 and 24 to the crimp-style terminals 36 on the power transmission lines 5b using the screws 29.

A notch 21b is formed in the cover 21 at the position corresponding to the bracket 34. When the cover 21 is secured to the support bed 20, therefore, the individual BNC terminals 32 and 33 are exposed via the notch 21b.

A modem 39 (see FIG. 5) incorporated in the operation control unit 9 is connected to signal lines 10a and 10b, which have terminal pins 37 and 38, respectively, at their distal ends. Since the terminal pin 37 for transmission is fitted into the transmission BNC terminal 32 and the terminal pin 38 for reception is fitted into the reception BNC terminal 33, the signal lines 10a and 10b are respectively connected to the antenna coils 30 and 31.

Figure 5:
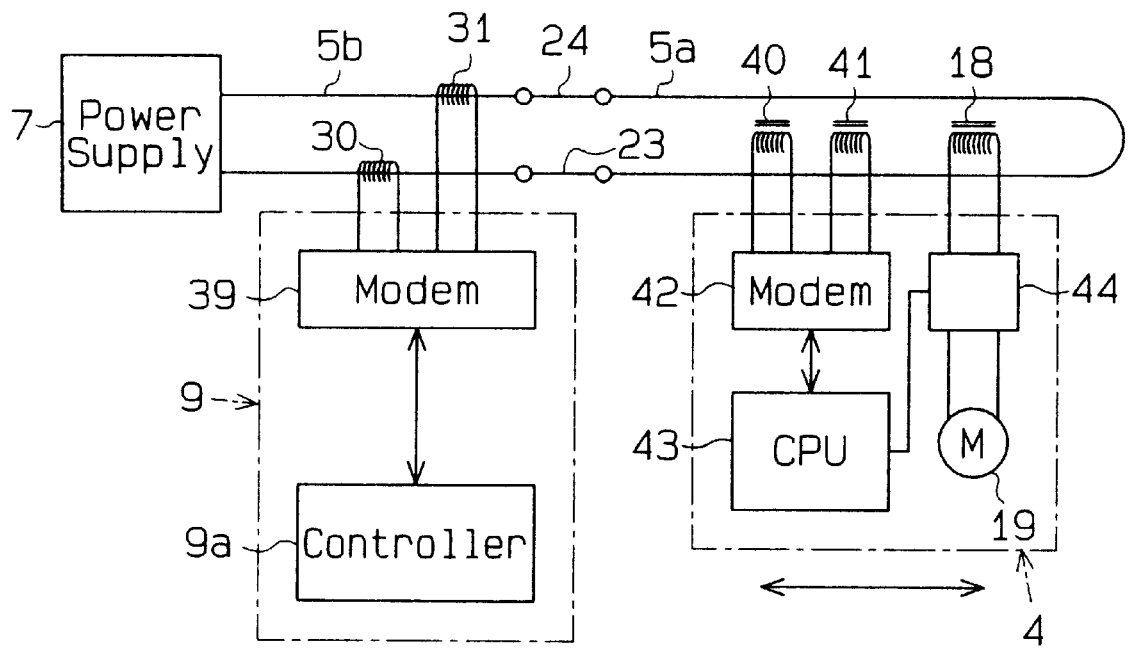
FIG. 5 is a schematic diagram of the electric structure of the conveying system.

FIG. 5 schematically shows the electrical constitution of the conveying system 1. Only one carriage 4 is shown in FIG. 5. As shown in FIG. 5, the loop-shaped power transmission lines 5a and 5b are connected to the power supply unit 7, which is a high-frequency power supply. The power supply unit 7 supplies an alternating current of, for example, several tens of kilohertz (kHz) to the power transmission lines 5a and 5b. The controller 9a in the operation control unit 9 is connected via the modem 39 to the transmission antenna coil 30 and the reception antenna coil 31. The modem 39 converts a signal from the controller 9a to an alternating current of a predetermined frequency and supplies the alternate current to the transmission antenna coil 30. Further, the modem 39 filters the alternating current, induced by the reception antenna coil 31, to extract the signal frequency component that has been superimposed on the alternating current and digitizes the filtered signal component before sending it to the controller 9a. An instruction signal to be transmitted to each carriage 4 is prepared by the controller 9a based on work instruction data input to an input device (not shown) provided in each station and on operation information acquired through communication from each carriage 4.

As shown in FIG. 5, each carriage 4 has a modem 42, which is connected to a reception antenna coil 40, a transmission antenna coil 41 and to a CPU 43 on a mother board (not shown) installed in the carriage's main body 4a. The CPU 43 performs drive control of the carriage 4. The modem 42 has the same function as the modem 39 in the operation control unit 9. That is, the modem 42 converts a digital signal from the CPU 43 to an alternating current of a predetermined frequency F and supplies the alternating current to the transmission antenna coil 41. Further, the modem 42 extracts a signal component of the frequency F from the alternating current, induced by the reception antenna coil 40, and digitizes this signal component. In this manner, the operation control unit 9 and each carriage 4 communicate with each other via the power transmission lines 5a and 5b, and the operation of the carriage 4 is controlled based on instruction signals from the operation control unit 9.

Each carriage 4 has a power supply circuit 44 connected to the power supply coil 18. The power supply circuit 44 rectifies the AC current induced on the power supply coil 18, reduces it to a predetermined voltage, and supplies the necessary drive voltages to the motor 19 and the CPU 43. The frequency of the signals sent to each carriage 4 from the operation control unit 9 differs from the frequency of signals sent to the operation control unit 9 from each carriage 4, so that transmission and reception between the operation control unit 9 and each carriage 4 can be executed simultaneously.

A description will now be given of the installation of the communication antenna unit 6. The installation of the communication antenna unit 6 is performed after laying the power transmission line 5a on the rail 3.

The support bed 20 of the communication antenna unit 6 is secured to the end of the rail 3 at a predetermined position by screws or bolts (not shown). Thereafter, the antenna unit 6 is connected to the two parts of the power transmission line 5a extending from the rail 3 and the two power transmission lines 5b extending from the power supply unit 7. More specifically, the individual crimp-style terminals 35 on the side of the power transmission line 5a and the individual crimp-style terminals 25 on the first end side of the two conductive lines 23 and 24 laid on the support bed 20 are connected together at the terminal seat 27 via the screws 29. Then, the individual crimp-style terminals 36 on the side of the power transmission lines 5b and the individual crimp-style terminals 26 on the second end side of the two conductive lines 23 and 24 are connected together at the terminal seat 28 via the screws 29. As apparent from the above, the conductive lines 23 and 24 of a the antenna unit 6 serve as conductive members between the two parts of the power transmission line 5a and the two power transmission lines 5b.

The terminal pins 37 and 38 respectively provided at the distal ends of the signal lines 10a and 10b are fitted into the BNC terminals 32 and 33, so that the signal lines 10a and 10b are respectively connected to the antenna coils 30 and 31.

When the connection of the lines to the communication antenna unit 6 is completed, the cover 21 is put on the support bed 20. The screws 22 are fitted into the screw holes 20b of the support columns 20a, while the screws 22 are put in the through holes 21a at the four corners of the cover 21 to secure the cover 21 to the support bed 20. Even with the cover 21 closed, the BNC terminals 32 and 33 into which the signal lines 10a and 10b are inserted are exposed through the notch 21b.

Each of the conductive lines 23 and 24 connects the associated power transmission line 5a on the rail side to the associated power transmission line 5b on the controller side to form a single combined power supply line. According to the present invention, the antenna coils 30 and 31 wound on the two combined power supply lines (5a-23-5b, 5a-24-5b) at predetermined positions are easily installed by merely connecting the power transmission lines 5a and 5b to the respective terminal seats 27 and 28 previously provided on the antenna unit 6 and by fitting the terminal pins 37 and 38 into the respective BNC terminals 32 and 33 previously provided on the antenna unit 6. Using the communication antenna unit 6 according to the present invention eliminates the troublesome work of winding a wire on each power line in the field to thereby form an antenna coil.

According to the conventional art, the power transmission lines 5a and 5b are connected together via the terminal seat provided at the end of the rail 3 for the purpose of facilitating the laying of the rail side power transmission lines 5a and the controller side power transmission lines 5b and for the purpose of suppressing tension on the conductive lines as much as possible. For those purposes, the crimp-style terminals 35 and 36 must be securely fixed to the distal ends of the power transmission lines 5a and 5b. Since the communication antenna unit 6 according to the first embodiment is located at the same place where the conventional terminal seat is positioned, the antenna unit 6 also serves the purpose of the conventional terminal seat. The first embodiment does not differ from the conventional art in the provision of the crimp-style terminals 35 and 36 at the distal ends of the power transmission lines 5a and 5b.

The advantages of the first embodiment will be discussed below.

The communication antenna unit 6 is designed by providing the conductive lines 23 and 24 on which the antenna coils 30 and 31 have been previously wound on the support bed 20 together with the terminal seats 27 and 28 to which the power transmission lines 5a and 5b are connected. Therefore, the work needed to prepare power transmission lines with the antenna coils 30 and 31 wound thereon is simply the connection of the power transmission lines 5a and 5b to the terminal seats 27 and 28 and the insertion of the terminal pins 37 and 38 into the BNC terminals 32 and 33. Unlike the conventional art, therefore, this embodiment eliminates the need for the difficult work of winding a wire on each power transmission line in the field, thus simplifying the assembling work required in the field.

Additionally, since the communication antenna unit 6 is previously prepared, the quality of the individual antenna coils 30 and 31 does not vary and is kept as designed. The use of the communication antenna unit 6 of the first embodiment therefore improves the reliability of the equipment.

The communication antenna unit 6 can be placed at the desired position along the power transmission lines 5a and 5b. Thus, the locations of the communications antenna coils 30 and 31 can be set freely depending on where the antenna unit 6 is located.

Since the communication antenna unit 6 is provided at the end of the rail 3 to be as close to the running area of the carriages 4 as possible, the signal transmission path during communication with the carriages 4 is relatively short. This suppresses the signal transmission loss and improves the communication reliability.

In consideration of simplifying the assembling work and reducing the tension on the power transmission lines, the communication antenna unit 6 is provided at the end of the rail (where the conventional terminal seat has been provided). The communication antenna unit 6 thus serves as the terminal seat too. While the work of attaching the crimp-style terminals 35 and 36 to the power transmission lines 5a and 5b is required, the method of this embodiment does not increase the working steps as compared with the conventional method. The method of this embodiment differs from the conventional method in that the antenna unit 6 is attached instead of the terminal seat of the conventional art. Therefore, the use of the method according to this embodiment does not increase the working steps; rather this method reduces the working steps because of the elimination of the work of winding the antenna wires at the installation site.

Since the support bed 20 and the cover 21 are made of aluminum, which has a magnetic flux shielding effect, noise originating from a change in an external magnetic flux hardly occurs inside the antenna unit 6.

The communication antenna unit 6 is provided as a single unit attachable to and detachable from the power transmission lines 5a and 5b. The use of the antenna unit 6 therefore facilitates the replacement of the antenna components.

Second Embodiment

The second embodiment of the present invention will be described below with reference to FIG. 6. According to the second embodiment, conductive metal bars 50 and 51 are used in place of the conductive lines 23 and 24, which are made of electric wires covered with insulator tubes. Like or same reference numerals are given to those components that are the same as the corresponding components of the first embodiment to avoid a redundant description, and only the differences will be discussed.

Figure 6:
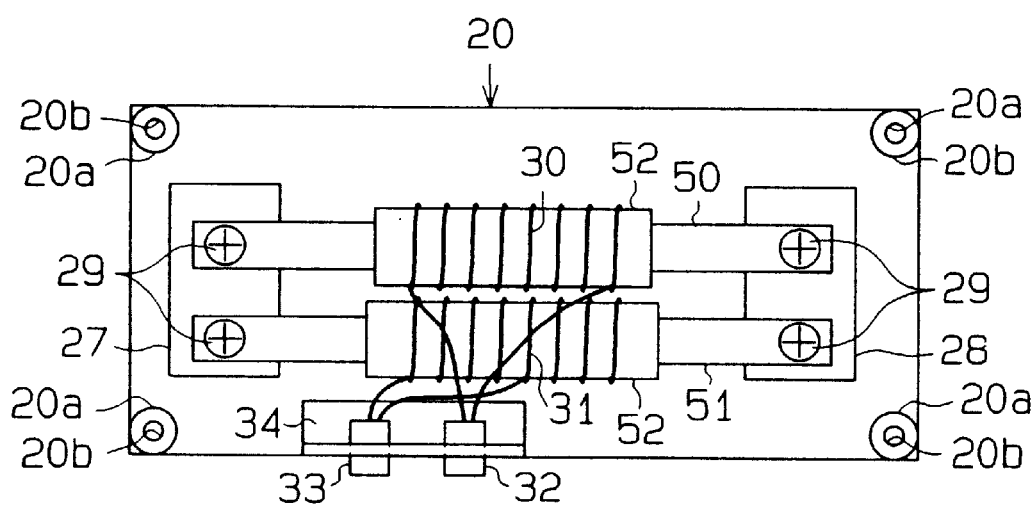
FIG. 6 is a plan view of a communication antenna unit according to the second embodiment of the present invention with its cover removed.

As shown in FIG. 6, the conductive metal bars 50 and 51, which serve as conductive members, are provided on the support bed 20 instead of the conductive lines 23 and 24 in the first embodiment. The conductive metal bars 50 and 51 are made of copper, for example. The conductive metal bars 50 and 51 do not have a coating and are thus exposed. Cylindrical bobbins 52 are fitted onto the conductive metal bars 50 and 51. Each bobbin 52 is made of an insulator resin, so that each bobbin 52 serves as an insulator member. The antennas 30 and 31 are wound like coils on the outer surfaces of the bobbins 52.

In a communication system, normally, a termination process (e.g., providing a so-called termination resistor at the end of the signal transmission path) is conducted to prevent reflection of a signal at the end of the signal transmission path. Since an electric wire, the surface of which is covered with a covering member like an insulator tube, is often used for the signal transmission path, the termination process normally involves the peeling of the covering member on the electric wire which forms the signal transmission path.

According to the second embodiment, by contrast, since the conductive metal bars 50 and 51 are used as conductive members constituting the communication antenna unit 6, which is located at the end of the rail 3, the termination process can be performed directly on the conductive metal bars 50 and 51. In other words, the termination process in the second embodiment (which is executed to remove only a signal frequency component from a high-frequency current)

requires no difficult work of peeling the cover, such as an insulation coating. The communication antenna unit according to the second embodiment has an advantage of facilitating the termination process in addition to the advantages of the first embodiment.

Third Embodiment

The third embodiment of the present invention will be described below with reference to FIG. 7. A communication antenna unit 55 according to the third embodiment differs from those of the first and second embodiments in that an electronic part, which must be connected to the power transmission line 5a or 5b, is installed on the common support bed 20 together with the antenna coils 30 and 31. Like or same reference numerals are given to those components that are the same as the corresponding components of the first and second embodiments to avoid a redundant description, and only the differences will be discussed below.

Figure 7:
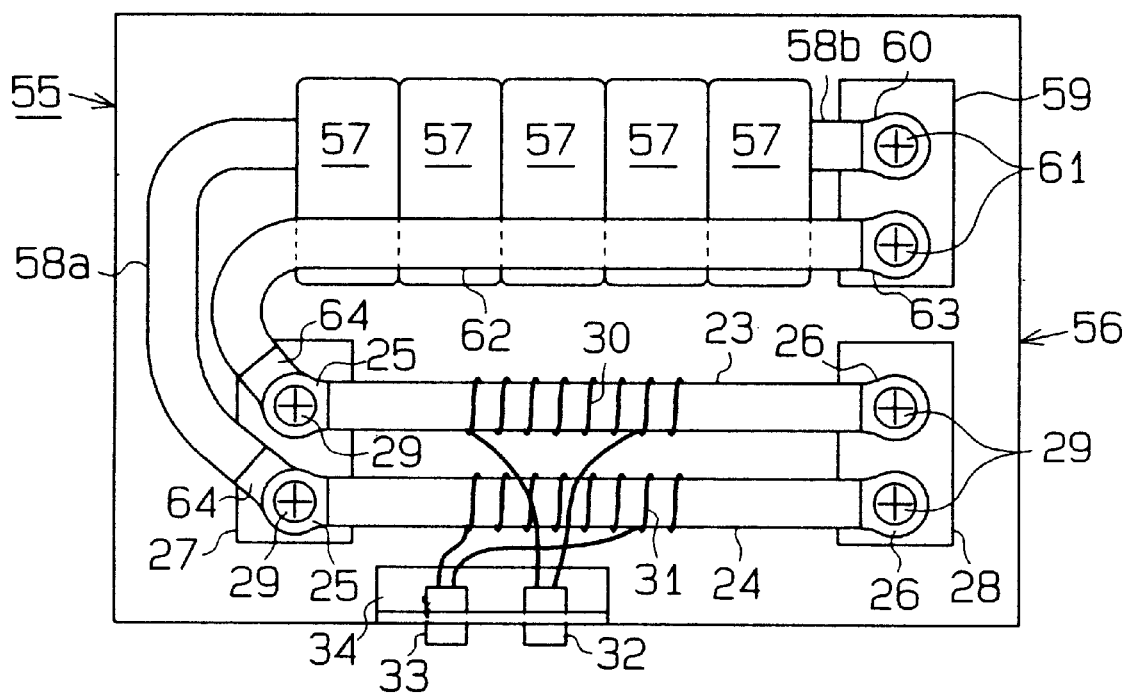
FIG. 7 is a plan view of a communication antenna unit according to the third embodiment of the present invention.
Figure 8:
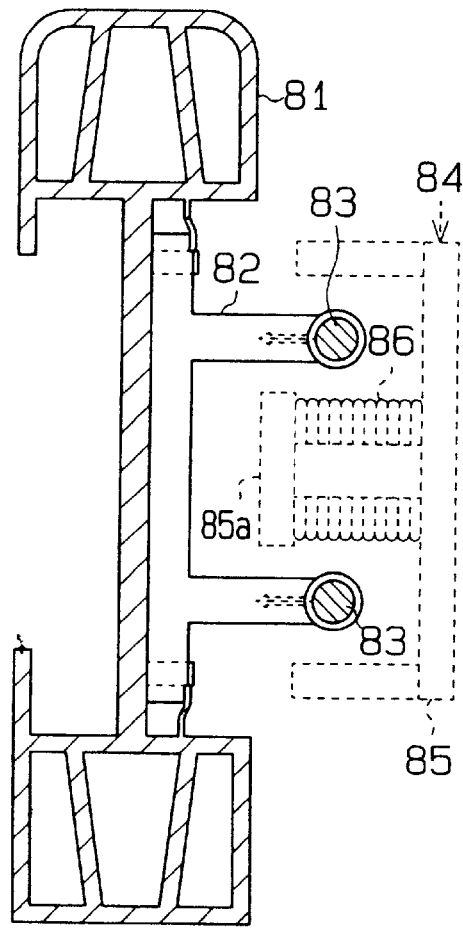
FIG. 8 is a front cross-sectional view illustrating the essential portions of a contactless power supply system according to conventional art.
Figure 9:
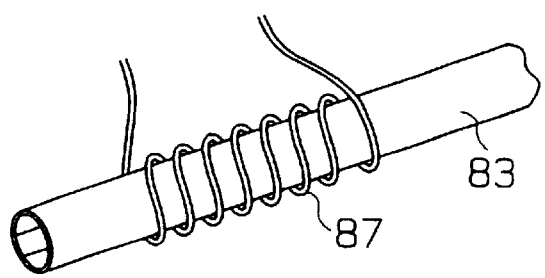
FIG. 9 is a perspective view showing an antenna coil wound around a power line according to the conventional art.

The communication antenna unit 55 shown in FIG. 7 is to be placed in the power supply unit 7 as shown in FIG. 4. The antenna unit 55 does not therefore have the cover 21 in the first embodiment. The antenna unit 55 has a support bed 56, which is a rectangular plate. The support bed 56 has an area about twice that of the support bed 20 in the first embodiment.

Two conductive lines 23 and 24 similar to those of the first embodiment are laid in parallel on the support bed 56. The crimp-style terminals 25 and 26 are securely fixed to both ends of each of the conductive lines 23 and 24. Since the crimp-style terminals 25 and 26 are fixed to the terminal seats 27 and 28 secured on the support bed 56 by means of the screws 29, the conductive lines 23 and 24 are secured on the support bed 56. The antenna coils 30 and 31 are respectively wound around the conductive lines 23 and 24. The antenna coils 30 and 31 are respectively connected to the BNC terminals 32 and 33, which are supported on the L-shaped bracket 34 fixed to one side of the support bed 56.

A plurality of capacitors 57, or electronic parts, are arranged in a line adjacent to the conductive line 23 on the support bed 56. The capacitors 57 are connected in series and are connected to the conductive line 24 via an electric wire 58a, which has the same power rating as the conductive lines 23 and 24. The capacitors 57 were originally provided in the power supply unit 7 to adjust the inductances of the power transmission lines 5a and 5b, which load of the power supply unit 7.

As shown in FIG. 7, one terminal seat 59 is secured on one end of the support bed 56. The capacitors 57 are connected to an electric wire 58b, which is on the opposite side of the capacitors to the electric wire 58a. A crimp-style terminal 60 is secured to the distal end of the electric wire 58b, and is fixed to the terminal seat 59 by a screw 61.

The antenna unit 55 has an electric wire 62, which has a first end portion to which a crimp-style terminal 63 is fixed and a second end portion to which a crimp-style terminal 64 is fixed. The crimp-style terminal 63 is secured to the terminal seat 59 by another screw 61. The crimp-style terminals 64 are secured together with the crimp-style terminals 25 on the terminal seat 27 by the screws 29. As a result, the electric wire 62 and the conductive line 23 are connected in series. Even in the third embodiment, the power transmission lines 5a and 5b are connected via unillustrated terminal seats at the end of the rail 3.

The communication antenna unit 55 intervenes between two power transmission lines extending from the high-frequency power supply accommodated in the power supply unit 7 and the two power transmission lines 5b extending from the end of the rail 3. More specifically, the antenna unit 55 is first attached to a predetermined position in the casing of the power supply unit 7. The individual crimp-style terminals provided at the distal ends of the two power transmission lines 5b extending from the rail 3 are then secured together with the crimp-style terminals 26 to the terminal seat 28 of the antenna unit 55 by the screws 29. Next, the individual crimp-style terminals provided at the distal ends of the two power transmission lines extending from the high-frequency power supply are secured together with the crimp-style terminals 60 and 63 to the terminal seat 59 of the antenna unit 55 by the screws 61. As a result, the two power transmission lines 5b are connected in series to the two power transmission lines from the high-frequency power supply through the antenna unit 55. Consequently, one power line 5b, the conductive line 23 (or 24) and the associated power transmission line from the high-frequency power supply form a single combined conductive power line with the antenna coil 30 (or 31) wound thereon. One (5b-24-58a-57-58b) of the two combined conductive power lines includes the series-connected capacitors 57.

The two signal lines 10a and 10b connected to the controller 9a are connected to the antenna coils 30 and 31 as the terminal pins 37 and 38 provided at the distal ends of the signal lines 10a and 10b are respectively fitted in the BNC terminals 32 and 33. The inductances of the power transmission lines 5a and 5b, which apply a load to the high-frequency power supply, can be adjusted by adjusting the number or the performance of the electronic parts 57.

According to the third embodiment, the series-connected capacitors 57 are incorporated in the communication antenna unit 55 together with the antenna coils 30 and 31, the conductive lines 23 and 24. Therefore, merely connecting the antenna unit 55 to various kinds of lines (e.g., power transmission lines 5b) completes the connection of the power transmission lines 5b to the electronic parts 57 that are to be electrically connected to the power transmission lines 5b. This simplifies the work of assembling the electronic parts 57 and the work of connecting the electronic parts 57 to the power transmission lines 5b. In addition, since the antenna unit 55 is located inside the casing of the power supply unit 7, the cover 21, which is needed in the first embodiment, is not essential.

Although several embodiments of the present invention have been described so far, it should be apparent to those skilled in the art that the present invention may be embodied in many other specific forms without departing from the spirit or scope of the invention. Particularly, it should be understood that the invention may be embodied in the following forms.

The communication antenna unit may be connected to only one of the two power transmission lines (e.g., one of a pair of power transmission lines 5a and 5b or one of a pair of power transmission lines extending from the high-frequency power supply). In this case, only one conductive line of a predetermined length should be arranged on the support bed of the antenna unit, and the transmission antenna coil 30 and the reception antenna coil 31 should both be wound on the single conductive line. According to this modification, the number of conductive lines in the antenna unit is decreased, thus reducing the work involved in connecting the antenna unit.

Instead of the separate transmission antenna and reception antenna, a single antenna serving as transmission and reception antennas may be used. If this transmission/reception antenna is wound around a single conductive member, the work involved in connecting the antenna unit is reduced.

The scheme of laying the power transmission lines is not limited to those of the first to third embodiments. The communication antenna units discussed in the previous two paragraphs may be employed in a communication system (or a conveying system) in which a single power transmission line is laid along a rail.

The communication antenna unit according to the present invention may be attached anywhere along the power transmission-line laying path as long as the location is outside the running area of the movable bodies (i.e., carriages 4). In the case of an endless rail (e.g., an annular rail), the antenna unit may be provided above the rail. With a rail laid on the ground, the antenna unit may be provided on the ground. In those cases, the signal attenuation in the signal transmission path can be suppressed if the communication antenna unit is placed close to the running area of the movable bodies.

The crimp-style terminals and the BNC terminals may be replaced with other types of terminals or connectors (e.g., plug-in type connectors).

The electronic parts used in the third embodiment are not limited to capacitors. Other kinds of electronic parts that are to be connected to the power transmission lines 5a and 5b may be placed on the support bed 56 within the antenna unit. Further, plural types of electronic parts may be retained in the antenna unit. Furthermore, parts that are not directly connected to the power transmission lines may be provided on the support bed in advance so that the work of assembling such parts in the field can be omitted.

The communication antennas are not limited to a coil type. For example, a capacitive coupling type antenna produced by coupling a flat-plate conductor and a conductive metal bar with an insulator therebetween may be used.

The present invention may be adapted to a communication system for movable bodies in which the rail is laid on the ground. The movable bodies in this case may be automatic carts or stacker cranes in an automatic warehouse. In this case, if the communication antenna unit of this invention is connected to the power transmission lines that are laid along the rail to supply power to automatic carts or stacker cranes, signals can be transmitted on the power transmission lines to accomplish communications as described above.

The movable bodies in the communication system are not limited to carriages that carry loads in a factory or a warehouse. Any kind of carriages may be used in this invention as long as power is acquired from the power transmission lines laid along the rail through the electromagnetic induction.

Therefore, the present examples and embodiments are to be considered as illustrative and not restrictive and the invention is not to be limited to the details given so far, but may be modified within the scope and equivalence of the appended claims.

What is claimed is:

1. An antenna unit for a communication system for a movable body, said communication system including a rail, a power transmission line, part of which is located along the rail, at least one movable body running along the rail while receiving power from the power transmission line, and a fixed station for establishing communications with the movable body, wherein communications between the movable body and the fixed station are accomplished by transmitting signals via the power transmission line, and wherein said antenna unit is constructed to be installed at a point in the power transmission line, said antenna unit comprising:

an antenna device serving as a communication antenna of said fixed station;

a conductive member to which said antenna device is attached, said conductive member having two ends;

first connection terminal means for connecting each end of said conductive member to an associated separate part of said power transmission line so that said conductive member is located between the separate parts of said power transmission line; and second connection terminal means for connecting said antenna device to a signal line connected to said fixed station.

2. The antenna unit according to claim 1, wherein said antenna device includes a coil wound around said conductive member.

3. The antenna unit according to claim 1, wherein said antenna device includes a transmission antenna and a reception antenna.

4. The antenna unit according to claim 1, wherein said conductive member includes a conductive metal bar.

5. The antenna unit according to claim 4, wherein said antenna device is wrapped around said conductive metal bar via an insulator located between the conductive metal bar and the antenna device.

6. The antenna unit according to claim 5, wherein said insulator includes a cylindrical bobbin.

7. The antenna unit according to claim 1 further comprising an electronic part that is to be electrically connected to said power transmission line, said electronic part being electrically connected to said conductive member.

8. The antenna unit according to claim 7, wherein said electronic part includes a capacitor for adjusting an inductance of said power transmission line in said communication system.

9. The antenna unit according to claim 7, wherein said antenna unit is attached to said power transmission line at a location that is outside a running area of said movable body but at a position close to the running area, whereby a distance between said movable body and said antenna device is relatively short, thus suppressing attenuation of signals transmitted through said power transmission line.

10. A communication system for a movable body, comprising:

a rail;

a power transmission line, part of which is provided along said rail;

at least one movable body running along said rail while receiving power from said power transmission line;

a fixed station for establishing communications with said movable body; and an antenna unit provided outside a running area of said movable body and in a path of said power transmission line, said antenna unit including:

an antenna device serving as a communication antenna of said fixed station;

a conductive member to which said antenna device is attached, said conductive member having two ends;

first connection terminal means for connecting each end of said conductive member to an associated separate part of said power transmission line so that said conductive member is located between the separate parts of said power transmission line, thereby forming a combined power/signal transmission line; and second connection terminal means for connecting said antenna device to a signal line connected to said fixed station, wherein communications between said movable body and said fixed station are accomplished by transmitting signals via said combined power/signal transmission line.

13

\* \* \* \* \*

14